Patented May 17, 1938

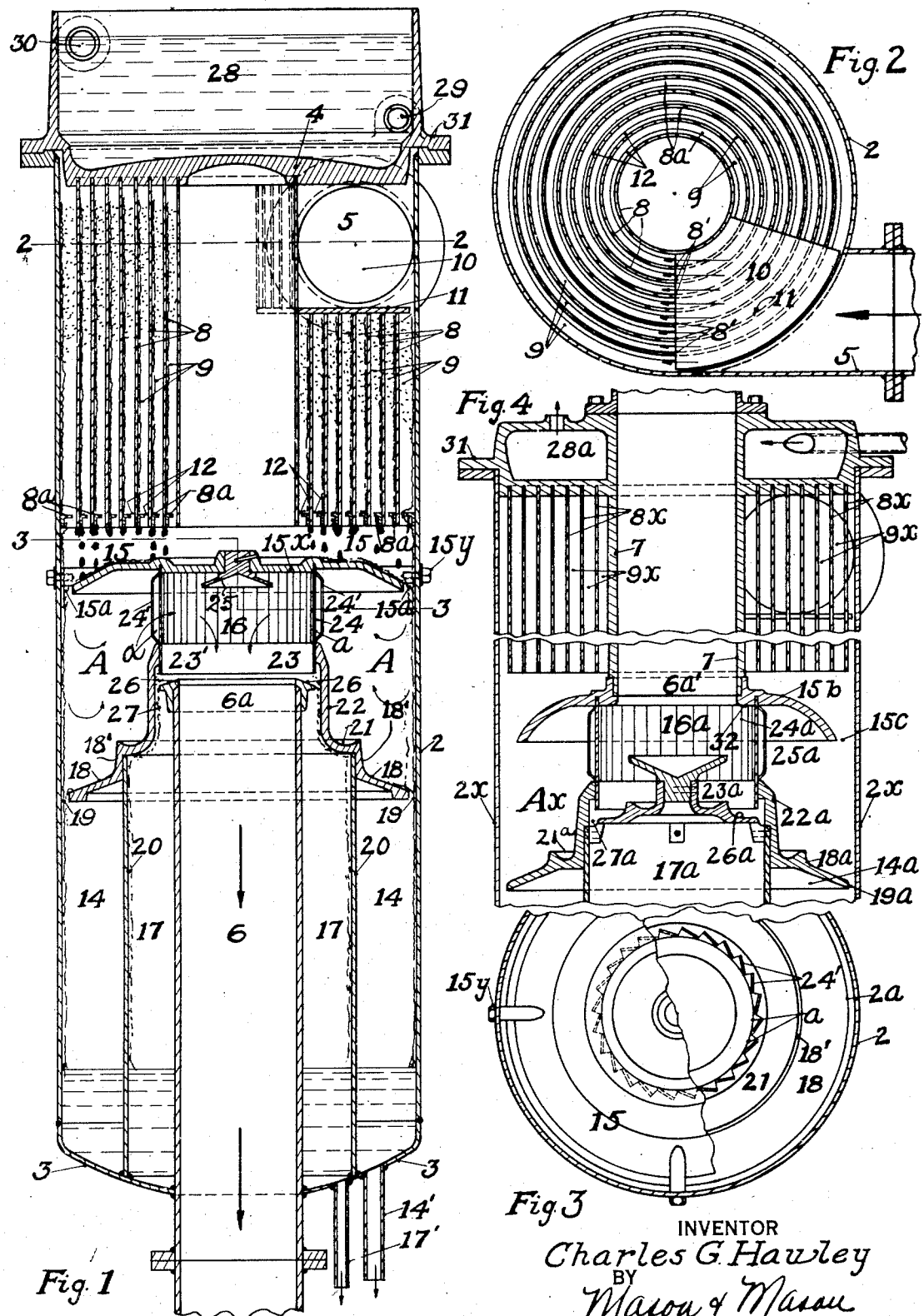

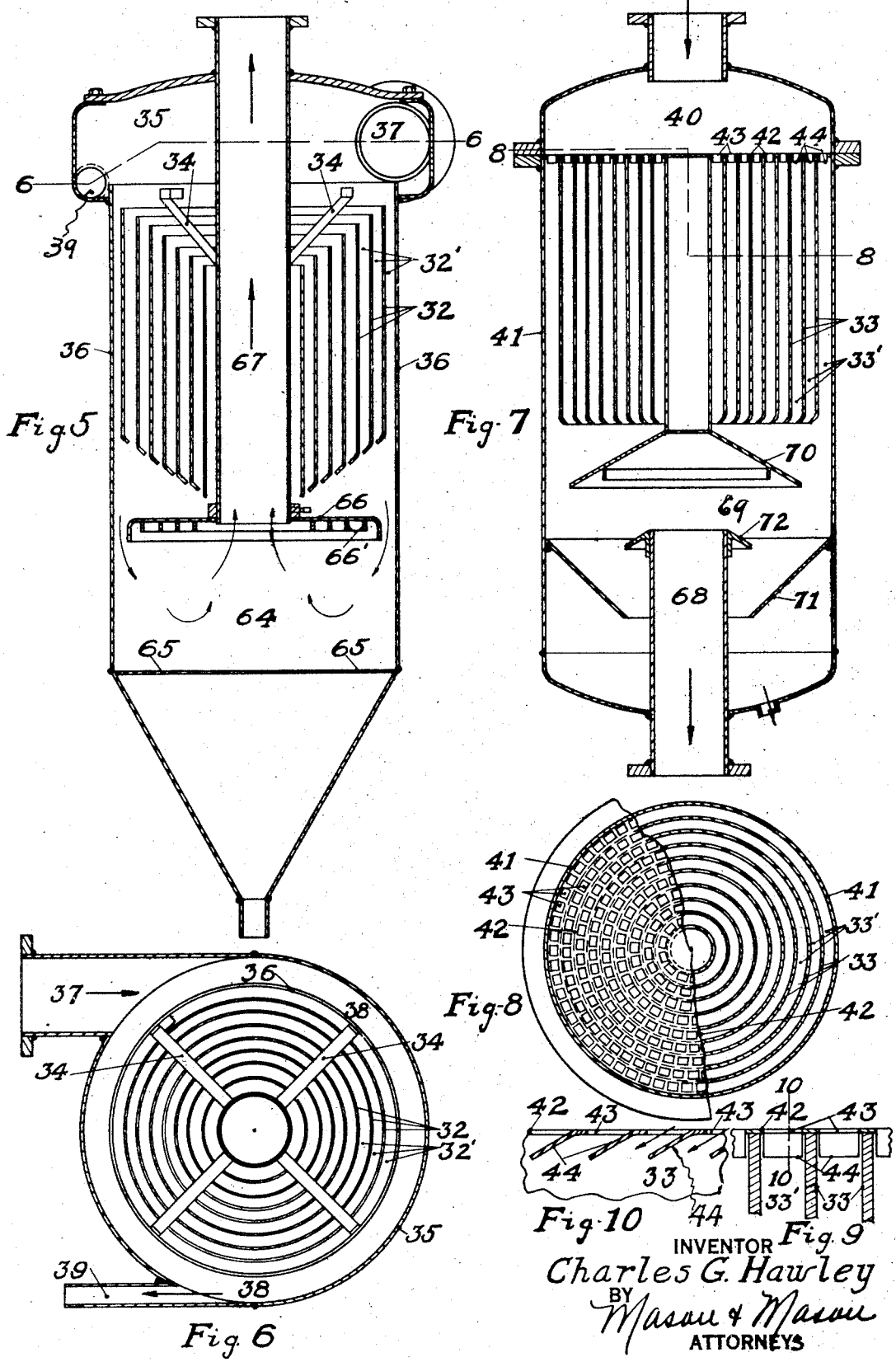

2,117,718

UNITED STATES PATENT OFFICE 2,117,718

TAR EXTRACTOR AND THE LIKE

Charles Gilbert Hawley, Cleveland, Ohio, assignor to Centrifix Corporation, Cleveland, Ohio, a corporation of Ohio Application May 18, 1935, Serial No. 22,252

5 Claims. (Cl. 183—79)

Air, gases and vapors are moved through pipes or conduits in both hot and cold conditions and many such streams are burdened or fogged with minute particles of liquid or with vapors which become liquid when condensed. Such burden or fog should be removed before the air, gas or vapor is devoted to its intended use and that is the purpose or object of the present invention.

A most difficult problem is presented when the purification of manufactured gas is attempted, particularly when the temperature thereof has been reduced to a point which causes the contained tar to assume a liquid state, finely subdivided.

By way of example, the following description will be directed to the particular use and adaptation of the invention as a tar extractor. Such description will serve to disclose the details of the invention, in various desirable forms, and, will make plain the fact that the invention is not restricted to that one use but instead is of general utility in the purification of other aeriform fluids which are in a state of swift movement, as within conduits or pipes.

Whatever the nature of the aeriform fluid to be treated it will herein be spoken of as a gas and the herein used word "tar" is to be taken as standing for the comminuted liquid to be intercepted and removed.

The invention comprises a single piece of apparatus which serves to subdivide the gas stream and cause the gas to forcibly impact very extensive liquid collecting surfaces whereby the fine liquid particles from the gas are collected or converted into aggregations of sufficient mass to be readily separated from the gas. To the end last mentioned, the invention also includes means for gathering the aggregated liquid from the surfaces mentioned. Still further, the invention includes means whereby the purified gas is discharged from the apparatus in a manner that prevents re-entrainment of the extracted matters and which effectively disposes of the latter.

The complete invention and also the best forms in which to construct the same will be readily understood upon reference to the drawings that form parts of this specification, and in which:—

Fig. 1 is a vertical section illustrating a purifier or extractor typically representative of the invention; Fig. 2 is a horizontal section on the line 2—2 of Fig. 1; Fig. 3 is a compound horizontal section upon the irregular lines 3—3 of Fig. 1; Fig. 4 illustrates a form adapted to discharge purified gas in an upward direction; Fig. 5 illustrates a modified form of the invention; Fig. 6 is a horizontal section thereof on the line 6—6 of Fig. 5; Fig. 7 illustrates a further form of the invention; Fig. 8 is the compound section thereof substantially upon the irregular line 8—8 of Fig. 7; Fig. 9 is an enlarged circumferential sectional detail of the whirl promoting plate shown in Fig. 7, and Fig. 8; and Fig. 10 is a sectional detail on the line 10—10 of Fig. 9.

The structures here exhibited will be described in sequence.

The structure of Fig. 1 comprises a closed drum of cylindrical shape positioned vertically and containing all the parts or elements which are required to extract tar fog from gas passing therethrough. The drum comprises the cylindrical shell portion 2, the bottom head 3 and a top head 4, the latter being of a special kind and preferably being removable, as will be explained.

The gas enters the drum through a tangential inlet 5 at its top and departs along the axis of the drum, and always from a point midway or intermediately between the top and bottom of the drum. In the case of Fig. 1 the gas leaves the drum through a central outlet pipe 6 which opens downward through the bottom 3, while in the case of Fig. 4 the outlet takes the form of a pipe 7 which extends upward through the top of the drum. The method and means of intercepting and removing the impurities from the gas are the same in both downflow and upflow forms of this invention.

The upper part of the drum shown in Figs. 1, 2 and 3 contains a plurality of concentric thin-walled cylinders 8 of graduated diameters and separated by narrow annular spaces 9. These cylinders join the top head 4 and are closed thereby at the top but the lower ends of all the cylinders are open.

As shown, these cylinders extend well below the inlet 5. The upper parts of all the cylinders, except perhaps the innermost, are cut away or notched opposite the inlet 5. A gas reception space 10 is thus formed; through which the gas enters tangentially the many cylindrical spaces 9. The reception space 10 is best floored by a gas directing plate 11 but is otherwise open; at ends and top.

Obviously, such construction causes the cylinders to present many thin vertical edges 8' to the incoming gas and thereby the gas is divided into many vertically extended thin streams, which pass spirally downward through respective annular spaces 9. Every particle of tar or other entrained matter is thus instantly positioned close to the surface ready to receive it, and as each thin stream is constantly deflected, due to the shape of the enclosing walls, the entrained particles are centrifugally and reliably deposited against surfaces which are adapted to hold them. Compelled by the attraction of the many surfaces and by the centrifugal forces developed by the moving gas, the substances are thus definitely collected or agglomerated and tending to adhere to such surfaces, are slowly driven spirally downward by the more swiftly moving gas. In the case of tar fog, the fog is thus condensed and agglomerated and the tar reaches and drips from the lower edges of the cylinders in the form of small streams and drops, large enough to be thereafter readily separable from the gas. Such separation is accomplished in the lower part of the drum, as hereinafter described.

These impact receiving surfaces are obviously most effective when of considerable depth, being thereby better adapted to retain the thin streams of gas for appreciable periods. On the other hand and for reasons to be explained, it is structurally desirable that the cylinders shall be of moderate depth. To that end the free discharge of the gas from the bottoms of the described stream deflecting surfaces is restrained, preferably in the manner shown in Fig. 1. In brief, the lower end of each cylinder is flanged inwardly, as by the application of a ring 8a. These flanges, however, are of less width than the spaces 9, leaving in each case an annular discharge slot 12; and in the aggregate, the areas of such slots greatly exceed the area of the inlet 5. Nevertheless, the presence of the rings or flanges 8a has the effect of retarding the spiral discharge of the gas, serving to lessen the pitch of the discharge spirals and thus increasing the rotative or spiral travel of the gas in every space 9.

Upon leaving the impact surfaces the gas, together with the agglomerated impurities, whirls downward into an open space 13 which is operatively remote from the gas outlet 6a. In each structure herein presented, the lower part of the casing with its contained parts and pipes comprises a means adapted to gather and discharge liquid falling from the cylinders and also adapted to separately discharge the purified gas. Thus in the case of Fig. 1, most of the collected matter is projected against the adjacent inner wall 2a of the shell or drum 2 and drains downward thereon and into a reception space 14. However, there is danger of re-entrainment and a residue of free droplets must be excluded from departure with the gas at outlet 6a. Hence the provision of the means or structures of Figs. 1 and 4 shown within the space between the impact cylinders and said outlet. Such means are of a non-moving character and function definitely to intercept the tar or other aggregated or agglomerated impurities and to retain the same in the lower part of the drum, ready for separate discharge therefrom.

In the case of Fig. 1 the preventing structure next above mentioned first includes a disc-like deflector 15 arranged horizontally below the impact cylinders and circumferentially separated from the shell by an annular space or slot 15a, affording a downward passage area greater than that of the inlet 5, and obviously, tending to direct all gas and collected substances outward, against the drum surface 2a. Directly beneath the deflector 15 and circumferentially protected thereby, is a complete centrifugal separating element 16 of the angularly bladed non-rotative type, through which all gas must pass in order to reach the outlet 6a. A separate cavity or space 17 is provided in the lower part of the drum for the reception of the residue of impurities removed by this separator in advance of the outlet 6a.

Spaced relatively far below the deflector 15 is an intermediate-floor-forming element 18, the lower outer edge of which closely approaches the inner surface of the drum leaving only a narrow circumferential slot 19; through which the material thrown against the surface 2a may pass into the space 14. The presence of the member 18 at the top of that space so limits communication between it and the middle space A that the downward sweeping force of gas is largely expended upon the part 18 and but slightly penetrates the collecting chamber 14. Reversely, the limitation of communication to the narrow slot 19 avoids all possibility of re-entrainment of matter once thrown down into the chamber 14.

An inner cylindrical part 20 separates the spaces 14 and 17, and, rising from the bottom 3, serves to support the floor element 18. By preference, the latter is definitely secured against rotation thereon. The member 18 is of generally conical effect, modified, however, by the upstanding circular wall 18' and the circumferential reaction sink 21. From thence upward the member 18 takes the form of a vertical sleeve 22 containing at the top an opening which is of considerably greater diameter than the outlet 6a. That opening receives the bottom portion 23 of a circumferentially bladed and tuyéred body 24. The upper end of the latter is secured to or in the part 15 preferably in the act of casting the part 15. The central portion of that deflector provides the part 24 with an imperforate top. That central part is identified by the mark 15x:— and, it serves to support a so-called vortex defeating cone 25, which latter is coaxial with and opens toward the outlet orifice 6a, at considerable distance therefrom.

It will be noted that the standpipe 6 rises within the part 22 of the floor 18 but does not reach the level of the lowest part of the tuyère element 24. Instead, the top of the pipe is equipped with an inclined or conical flange 26 also below that part and which extends outwardly beneath the lower edge of the tuyère portion and nearly to the inner wall of the part 22, thus forming a narrow annular discharge slot 27 at the top of the reception space 17.

The part 23, 24 is of special interest. It comprises a so-called whirl-promoting tuyère made by longitudinally shearing and pressing a single piece of metal to form a circumferential series of tangential blades 24' and tangential tuyère openings, a. This so-called tuyère is, of course, stationary, but its presence in the path of the moving gas serves first to sub-divide the gas into many vertically extended thin streams which enter the interior of the tuyère structure tangentially and therefore take on rapid rotation therein. The effect of such rotation is to centrifugally separate and displace all minute solids and liquid particles which may enter with the gas, driving such substances downward into the outer part of the bowl or race portion 23' and thus discharging them through the narrow slot 27, permitting only purified or clean gas to escape through the orifice 6a and pipe 6.

By preference, the element 15 and the element 24 are fixed within the drum 2 as by bolts 15y, being secured only after the element 18, 21 and 22 has been placed upon the tubular part 20.

However, any convenient means may be used to prevent rotation of the parts 15, 24.

Suitably valved drainpipes 14' and 17' are provided for emptying the spaces 14 and 17.

The complete operation of the internal portions of this apparatus will be understood from the foregoing and does not require summarization.

Frequently, in the treatment of the gas it is found that either high or low temperature makes the separation of tar and the like difficult. In the present invention this difficulty is completely overcome through the provision of means for tempering the cylindrical impact parts 8. Those cylinders are formed from relatively thin metal which conducts heat rapidly and their upper edges are intimately united with the metal top 4. This may be done by welding them to that plate but, by preference, a better union is employed. As shown in Fig. 1, the part 4 is a metal casting and in the course of manufacturing the same, the upper edges of the part 8 are deeply embedded directly in that casting. The part 4 thus becomes an effective heat transfer element, adapted either to transmit heat from the parts 8 or to transmit heat thereto. In that manner, the impact surfaces may be ideally conditioned for the reception and retention of tarry matters and the like.

Any suitable means may be employed for heating or cooling the heat transfer element 4, such for example, as the liquid chamber 28 formed thereon. The latter may be an open vessel as shown in Fig. 1 or a closed vessel as shown in Fig. 4, and is provided with pipe connections 29 and 30 for steam or tempered liquid. Clearly, either hot or cool liquid or steam may be employed therein as desirable to heat or to cool the extensive surfaces provided by the many cylindrical parts 8.

Most conveniently, the part 4 is attached to the top of the drum by suitable bolted flanges 31; and when desired the entire impact element comprising the head 4 and the many cylinders 8 may be lifted from the drum for inspection or to be cleaned.

Turning now to Fig. 4, it will be seen that it is a fragmentary representation, several parts being broken away. Nevertheless it serves to illustrate the manner in which the extractor is modified to adapt it to the discharge of the gas from its top.

The extractor of Fig. 4 differs in few particulars from that shown in Fig. 1. The impact-surface tempering-compartment 28a is of the closed type, above mentioned. The central outlet pipe 7 leads upwardly from a centrifugal separator 16a and is surrounded by the described impact cylinders, here marked 8x, separated by the now familiar spaces 9x. The parts 8x are assumed to be long enough to dispense with the inwardly turned flanges at their lower ends; and are so shown. The part 15b is quite identical with the deflector or spreader before described but it is here fixed upon the lower end of the pipe 7, and the latter serves to support both of the parts 15b and 24a. The vortex defeating cone 25a is here positioned in the lower part of the tuyère element 16a, opposite the top outlet 6a'. It is supported upon a floor portion 26a which forms the bottom of the separating bowl 23a. As shown, the floor is smaller than that bowl portion, thus forming the circumferential discharge slot 27a, by which limited communication is established with the underlying reception space 17a. The outer reception space 14a communicates with the middle space $A^x$ through a narrow circumferential slot 19a.

The operation of the device of Fig. 4 is identical with that before described except that the secondary separator is made to discharge the purified gas through its top. However, it is important to note that the top of the element 16a presents the annular abutment portion 32, surrounding the outlet 6a' and it is the presence of that part which causes the whirling gas to move spirally downward into the bowl 23a and deliver the separated substances to the discharge slot 27a; before the gas can reach the outlet 6a'. The part 25a performs the function of intercepting any stray foreign substances from the gas as it whirls upward toward that outlet and the function of causing such substances to be centrifugally returned to the down moving currents of gas within the elements 16a.

The modified structures of Figs. 5, 7 and 11 resemble that of Fig. 1 in that each thereof embodies a plurality of spaced plates positioned to sub-divide downwardly moving gas and presenting extensive surfaces for the impact and collection of the liquid particles to be removed from the gas. Figs. 5 and 7 differ chiefly in individual gas reception spaces and gas inlets which constitute provisions for introducing the gas to respective sub-dividing plates 32 and 33 without cutting away or notching the plates, as is done in Figs. 1 and 4. The cylindrical parts 32 of Fig. 5 are spaced and held by several inclined radial stays 34, to which their tops are welded. As shown, parts 32 are of the same length, causing their lower, flanged ends to present a generally conical appearance. But this is optional, it being obvious that the parts 32 may extend down to a common level, for example, as shown in Fig. 7.

By preference, in the case of Fig. 5, the top 35 of the drum or casing 36 is enlarged; and the gas is introduced through a tangential inlet nozzle 37. A channel 38 thus formed, serves as an initial tar collecting groove and is provided with a tar drain 39. Clearly, the gas entering the head 35 necessarily whirls therein and thus is vortically distributed within the many spaced cylinders 32; affording in each space 32' sufficient centrifugal effect to impact the liquid particles upon the surfaces of the parts 32. Thus the described assemblage or aggregation of liquid particles is accomplished. The collected liquid drops from the lower edges of the parts 32, as before described.

In the case of Fig. 7, the impacting of the liquid upon the inner surfaces of the cylinders 33 is accomplished by admitting gas to the head space 40 of the drum 41 and thereafter positively distributing the gas to the many cylindrical spaces 33, through many small tuyère openings 42 in a plate 43. For each opening there is an angular gas deflecting blade 44 (best shown in Figs. 9 and 10) and obviously the downward moving gas is thereby thrown into rotation within the spaces 33' and against the cylindrical surfaces. Most conveniently, the tops of the cylindrical parts 33 are welded directly to the bottom of the plate 43, and the latter serves to rigidly support them.

The lower parts of the structures of Figs. 5, and 7 are intended for comparison with like parts of Figs. 1 and 4.

The final liquid collector of Fig. 5 is of still simpler kind, comprising a large settling chamber 64, preferably having the assisting flange 65;

and, in lieu of a positive centrifugal separator, is provided with a spreader plate 66 that keeps falling liquid away from the gas outlet 67. The underside 66' of the plate 66 preferably is corrugated, to assist in retaining and forming into sizable drops any liquid deposited thereon.

In Fig. 7 the gas outlet 68 extends downward through the bottom of the drum 41 and the liquid settling chamber 69 contains a corrugated deflector 7 which overhangs the outlet; and an intermediate bottom 71, and a flange 72 surrounding the outlet 68, all working to prevent stray quantities of liquid from reaching the gas outlet.

It will now be apparent that in respect to the removal of minute liquid particles from a gas stream, this invention is of a two-fold or multistage character. By this invention the minute liquid particles moving with the gas are first intercepted, stopped and gathered together in films and masses which are permitted to drain downward so that the collected liquid may leave the collecting surfaces in the form of drops and streams of considerable size. For a time the liquid and the gas move in the same direction; and, the movement of gas across the deposited liquid tends to force the liquid into most intimate contact therewith; both, adding to the efficacy of the process. As will now be clear, numberless very minute particles conveyed by the gas are combined into a small number of much larger liquid masses of such size and weight as to admit of their separation from the gas by almost any separating means that may be employed for the purpose.

Quite obviously the efficacy of the first step of the process is based upon the advantage taken of and afforded by the surface tension of the liquid itself and the adhesive attraction of the surfaces upon which the liquid is deposited and upon which the accumulated liquid tends to spread in film formation. Adherence to the surface is so certain that while the collected liquid is always free to drain downward, at no time is it in danger of reatomization by or in the swiftly passing gas. The second step of the process is limited to assembling the liquid drops and streams, while permitting the purified gas to depart and separately discharging the collected liquid.

It is remarkable that this treatment of artificial gas results in the production of tar of very superior quality, almost entirely free from water and carbon. The better quality is explained by the surface tension of the liquid tar which by adhering to the surfaces, serves to extrude heavier substances and by so exposing them makes certain that they shall be carried away by the departing gas.

The self-cleaning character of all of the described liquid extractors is to be noted, and is best explained by the tendency of liquid to closely adhere to the separating surfaces and by extrusion to prevent lodgment thereon of any material which might otherwise clog the apparatus. This fact is of special practical importance.

I claim:

1. The herein described apparatus for extracting liquid from gas burdened with particles thereof, comprising a suitably encased plurality of concentric thin walled cylinders separated by spaces which are wider than a drop of said liquid, said cylinders at one end being open within the casing, means causing the burdened gas to enter and whirlingly progress between said cylinders enroute to said open end, a centrifugal liquid separator lodged in said casing beyond the open end of said cylinders and forming the gas exit of the casing, and, other means for the discharge of the separated liquid.

2. The herein described apparatus for extracting liquid from gas burdened with particles thereof, comprising a suitably encased plurality of concentric thin walled cylinders separated by spaces which are wider than a drop of said liquid, said cylinders at one end being open within the casing, means causing the burdened gas to enter and whirlingly progress between said cylinders enroute to said open end and means causing the gas and the separated liquid to take on a whirling motion beyond said cylinders, for the final separation of the liquid from the gas.

3. The herein described apparatus for extracting liquid from gas burdened with particles thereof, comprising a vertical casing, in combination with a plurality of concentric thin walled vertical film reception cylinders fixed within said casing and separated by spaces which are wider than the liquid films to be formed thereon, the bottoms of said cylinders being open within said casing, means causing the burdened gas to enter the tops of the spaces between said cylinders and to spirally descend within each said cylinder, said casing containing a gas and liquid reception space beneath said cylinders, means in a lower part of said reception space adapted to gather and discharge liquid falling from the bottoms of said cylinders, and means for the separate discharge of the purified gas from said reception space.

4. The herein described apparatus for extracting finely divided liquid from gas burdened therewith, comprising a vertical casing having a gas inlet and a gas expansion space in its upper part, in combination with a plurality of concentric thin walled vertical film reception cylinders fixed within said casing and separated by spaces which are wider than the liquid films to be formed thereon, the bottoms of said cylinders being open within said casing, means causing the burdened gas from said expansion space to enter the tops of the spaces between said cylinders and to spirally descend therein, said casing containing a gas and liquid reception space beneath said cylinders, means in the lower part of said reception space adapted to gather and discharge liquid falling from the bottom of said cylinders, and means for the separate discharge of the purified gas from said reception space.

5. The combination as claimed in claim 3 and having in addition means for heating or cooling said cylinders at will.

CHARLES GILBERT HAWLEY.